(12) United States Patent
Nakagawa

(10) Patent No.: US 6,519,418 B2
(45) Date of Patent: Feb. 11, 2003

(54) CAMERA CAPABLE OF VARYING LUMINOUS INTENSITY DISTRIBUTION ANGLE OF FLASH DEVICE

(75) Inventor: Kazuo Nakagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/766,709

(22) Filed: Jan. 22, 2001

(65) Prior Publication Data

US 2001/0033745 A1 Oct. 25, 2001

(30) Foreign Application Priority Data

Jan. 31, 2000 (JP) .................................... 2000-022723

(51) Int. Cl.[7] .............................................. G03B 15/02
(52) U.S. Cl. ......................................... 396/62; 396/175
(58) Field of Search ........................... 396/61, 62, 175, 396/176, 177, 178

(56) References Cited

U.S. PATENT DOCUMENTS 5,465,131 A * 11/1995 Haraguchi et al. ............ 396/61
5,848,302 A * 12/1998 Machida ...................... 396/60
5,956,530 A *  9/1999 Yoshibe et al. ............... 396/62

OTHER PUBLICATIONS

Camera Having Zoom Flash Device, U.S. Patent Application Publication, US 2001/0028792 A1, Publication Date Oct. 11, 2001.*

* cited by examiner

Primary Examiner—Russell Adams
Assistant Examiner—Arthur A Smith
(74) Attorney, Agent, or Firm—Robin, Blecker & Daley

(57) ABSTRACT

A camera includes a lens barrel having a cam part in which a plurality of magnification varying cam areas for varying magnification and a plurality of focusing cam areas for focusing are alternately formed in a continuous manner, a flash light emitting part arranged to be capable of varying a luminous intensity distribution angle, a driving part for causing the lens barrel to move along an optical axis while rotating around the optical axis, the lens barrel having a lens thereof driven along the cam part to perform a magnification varying action or a focusing action, and a control mechanism for controlling the luminous intensity distribution angle of the flash light emitting part in association with the rotation of the lens barrel in such a way as to cause the luminous intensity distribution angle of the flash light emitting part to vary when the lens is driven to move along one of the plurality of magnification varying cam areas and to cause the luminous intensity distribution angle of the flash light emitting part not to vary when the lens is driven to move along one of the plurality of focusing cam areas.

16 Claims, 10 Drawing Sheets

CAMERA CAPABLE OF VARYING LUMINOUS INTENSITY DISTRIBUTION ANGLE OF FLASH DEVICE

BACKGROUND OF THE INVENTION

1. Field of the Invention

The present invention relates to a camera having a flash light emitting part arranged to vary the luminous intensity distribution angle thereof in association with a magnification varying action of a photo-taking lens.

2. Description of Related Art

Compact and lightweight cameras having built-in flash devices have been popularly in use. Most of the so-called compact cameras which are designed mainly for taking snapshots have built-in flash devices.

In these days, many of such compact cameras are provided also with zoom lenses for the purpose of improving the function thereof. As a result, many of the built-in flash devices of such cameras have come to be arranged to emit a large quantity of light to make light emission reachable a farther distance. For this purpose, either the size of the capacitor of a light emission circuit is increased or the flash device is arranged to be zoomed to make the light quantity distribution apposite to each of variable focal lengths of the photo-taking lens. The flash device of this type hereinafter will be called a built-in zoom flash device.

For example, a camera having a built-in zoom flash device in combination with a zoom lens, as disclosed in Japanese Patent No. 2662969, is provided with a magnification varying lens group to enable a photo-taking lens to perform a zooming action. When the magnification varying lens group is driven by a zoom motor, a cam plate is driven to the right or left in association with the movement of a gear provided at the magnification varying lens group. Then, the flash device is caused to perform a zooming action along a cam surface formed on the cam plate.

Another camera of the kind having a built-in zoom flash device, as disclosed in Japanese Laid-Open Patent Application No. Hei 11-212143, has a lens driving gear formed integrally with the driving tube of a zoom photo-taking lens and disposed at the last stage of a driving system gear train for the zoom photo-taking lens. In combination with the lens driving gear, a cylindrical cam is provided for driving an illumination angle varying member of the zoom flash device and is arranged at the last stage of a driving system gear train for the flash device. These gear trains are arranged to be driven respectively by driving motors.

In each of these cameras as mentioned above, the lens barrel mechanism is composed of a zoom mechanism part and a focusing mechanism part which are arranged separately from each other. Therefore, the flash device can be zoomed to obtain a light quantity distribution apposite to each focal length without any problem by simply interlocking the flash device with the zoom mechanism part.

However, in order to have the zoom mechanism part separately arranged from the focusing mechanism part, it is necessary in general to provide a lens group for a focusing action within the zoom mechanism part and to arrange the focusing mechanism part to drive the focusing lens group with a drive source which is provided solely for that purpose. This arrangement makes the lens barrel mechanism complex to cause an increase in cost. In addition to that, since the focusing mechanism part is disposed within the lens barrel, the size of the lens barrel is caused to increase.

To solve the above problem, the so-called stepped zoom lens barrel has recently been developed for reduction in size and simplification of the structure of cameras. The zoom lens barrel of this kind includes a stepped cam formed to have zoom driving cam areas and focus driving cam areas alternately arranged. This cam arrangement forms a lens driving mechanism which causes a photo-taking lens to perform stepwise zooming and to perform focusing at each zooming step.

However, the stepped zoom lens barrel has the following problem. Since the zoom mechanism and the focusing mechanism are arranged in one body, the above-stated arrangement for simply interlocking a flash device with the lens barrel would causes the flash device to be driven also in focusing. In the event of such driving, the distribution of light quantity and the guide number of the flash device would vary to cause differences in finished photographs.

BRIEF SUMMARY OF THE INVENTION

It is, therefore, an object of the invention to provide a stepped zoom type camera simply arranged to be capable of giving always an optimum luminous intensity distribution angle of a flash device.

To attain the above object, in accordance with an aspect of the invention, there is provided a camera, which comprises a lens barrel having a cam part in which a plurality of magnification varying cam areas for varying magnification and a plurality of focusing cam areas for focusing are alternately formed in a continuous manner, a flash light emitting part arranged to be capable of varying a luminous intensity distribution angle, driving means for causing the lens barrel to move along an optical axis while rotating around the optical axis, the lens barrel having a lens thereof driven along the cam part to perform a magnification varying action or a focusing action, and control means for controlling the luminous intensity distribution angle of the flash light emitting part in association with the rotation of the lens barrel in such a way as to cause the luminous intensity distribution angle of the flash light emitting part to vary when the lens is driven to move along one of the plurality of magnification varying cam areas and to cause the luminous intensity distribution angle of the flash light emitting part not to vary when the lens is driven to move along one of the plurality of focusing cam areas.

In particular, in the camera, the flash light emitting part includes a light source and a Fresnel lens, and the control means causes a relative interval between the light source and the Fresnel lens to vary.

Further, in the camera, the control means has a rotary cam in which a cam part where an amount of lift varies in one of the plurality of magnification varying areas and a cam part where the amount of lift remains constant in one of the plurality of focusing cam areas are formed, and the flash light emitting part is arranged to vary the luminous intensity distribution angle thereof according to the amount of lift of the rotary cam.

Further, in the camera, the rotary cam is arranged to rotate in association with the rotation of the lens barrel.

Further, the camera further comprises a lever arranged to be driven to move by the cam part of the rotary cam, and the luminous intensity distribution angle of the flash light emitting part varies in association with the driven movement of the lever.

Further, in the camera, the flash light emitting part is in a state of being stowed within a body of the camera when the lens barrel is in a state of not being used.

Further, in the camera, the flash light emitting part is in a state of being popped up from the body of the camera when the lens barrel is in a state of being used.

In addition, in accordance with another aspect of the invention, there is provided a camera, which comprises a lens barrel having a cam part in which a plurality of magnification varying cam areas for varying magnification and a plurality of focusing cam areas for focusing are alternately formed in a continuous manner, a flash light emitting part arranged to be capable of varying a luminous intensity distribution angle, driving means for causing the lens barrel to move along an optical axis while rotating around the optical axis, the lens barrel having a lens thereof driven along the cam part to perform a magnification varying action or a focusing action, and a rotary cam member arranged to rotate in association with the rotation of the lens barrel, the rotary cam member having, formed therein, a cam part where an amount of cam lift varies correspondingly with one of the plurality of magnification varying cam areas and a cam part where the amount of cam lift remains constant correspondingly with one of the plurality of focusing cam areas, wherein the flash light emitting part is arranged to vary the luminous intensity distribution angle thereof according to the amount of cam lift of the rotary cam member.

Further, in the camera, the flash light emitting part includes a light source and a Fresnel lens, and a relative interval between the light source and the Fresnel lens varies in accordance with the amount of cam lift.

Further, the camera further comprises a lever arranged to be driven to move by the cam part of the rotary cam member, and the luminous intensity distribution angle of the flash light emitting part varies in association with the driven movement of the lever.

These and further objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
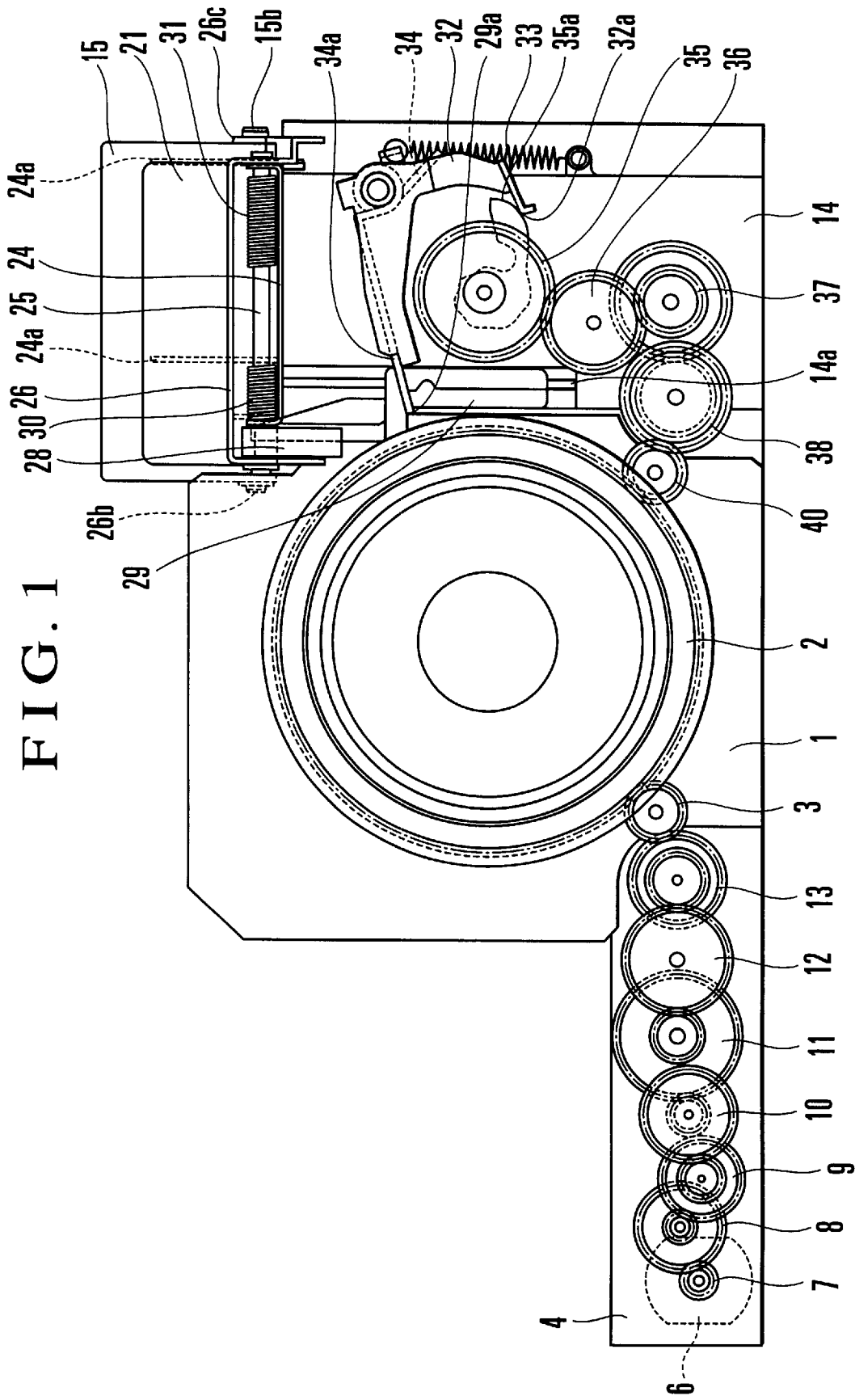
FIG. 1 is a front view showing the arrangement of a camera according to a first embodiment of the invention in a state obtained with a lens barrel at a drawn-in position.
Figure 2:
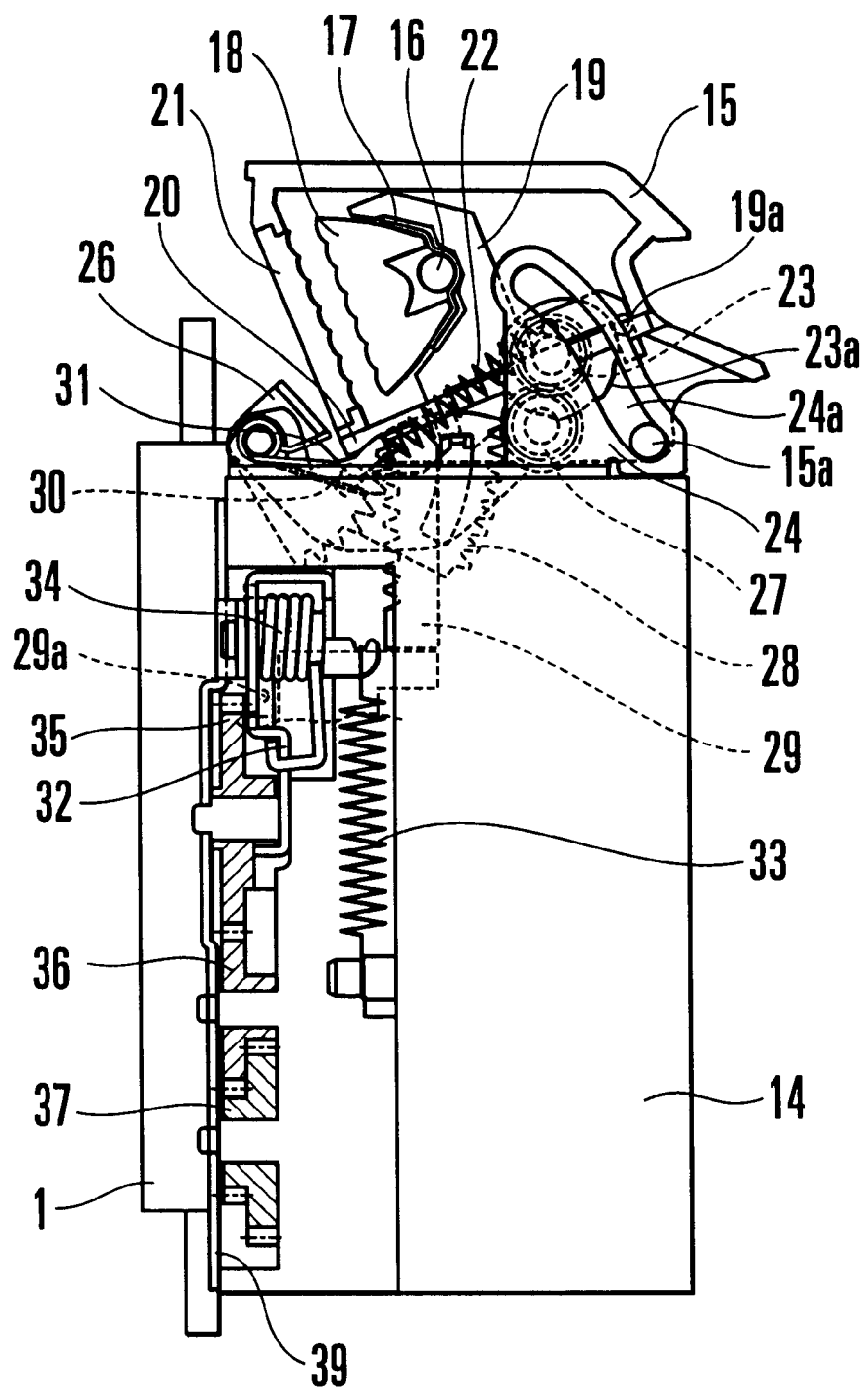
FIG. 2 is a side view showing the arrangement of the camera in the state obtained with the lens barrel at the drawn-in position.
Figure 3:
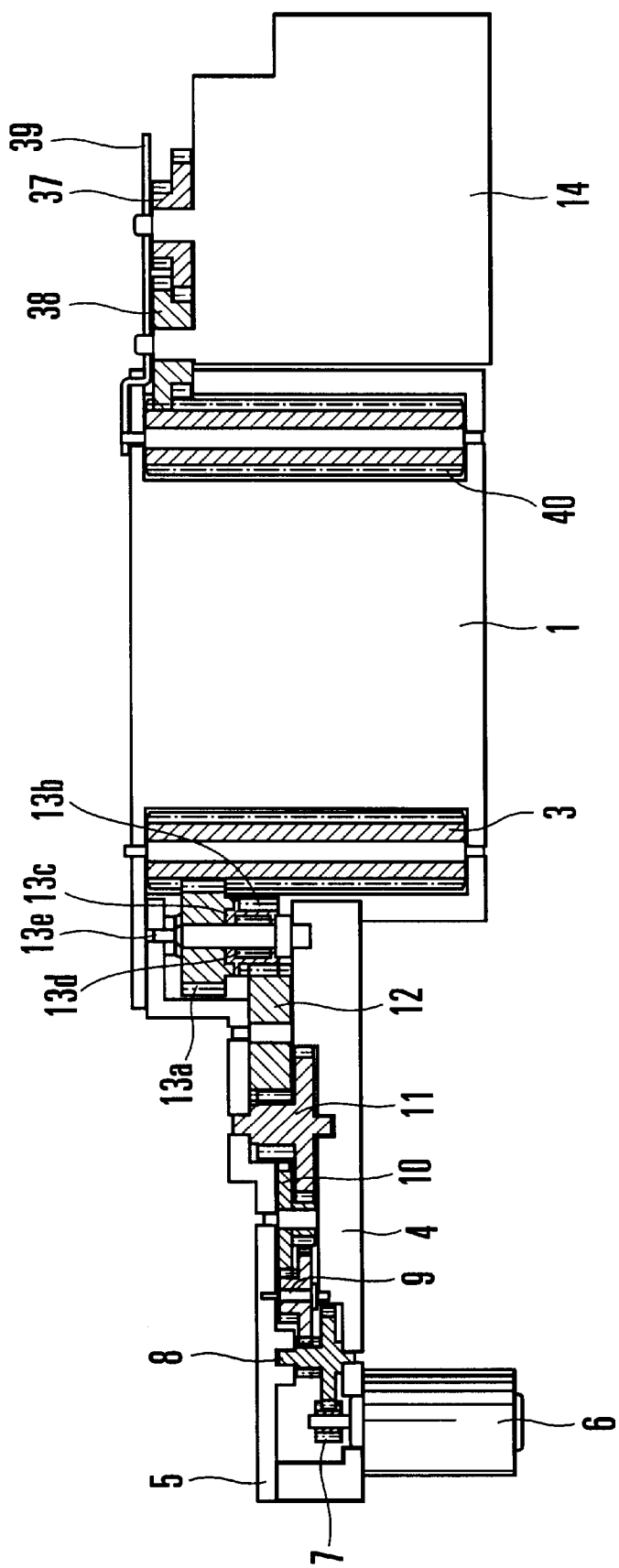
FIG. 3 is a bottom view showing the arrangement of the camera in the state obtained with the lens barrel at the drawn-in position.
Figure 4:
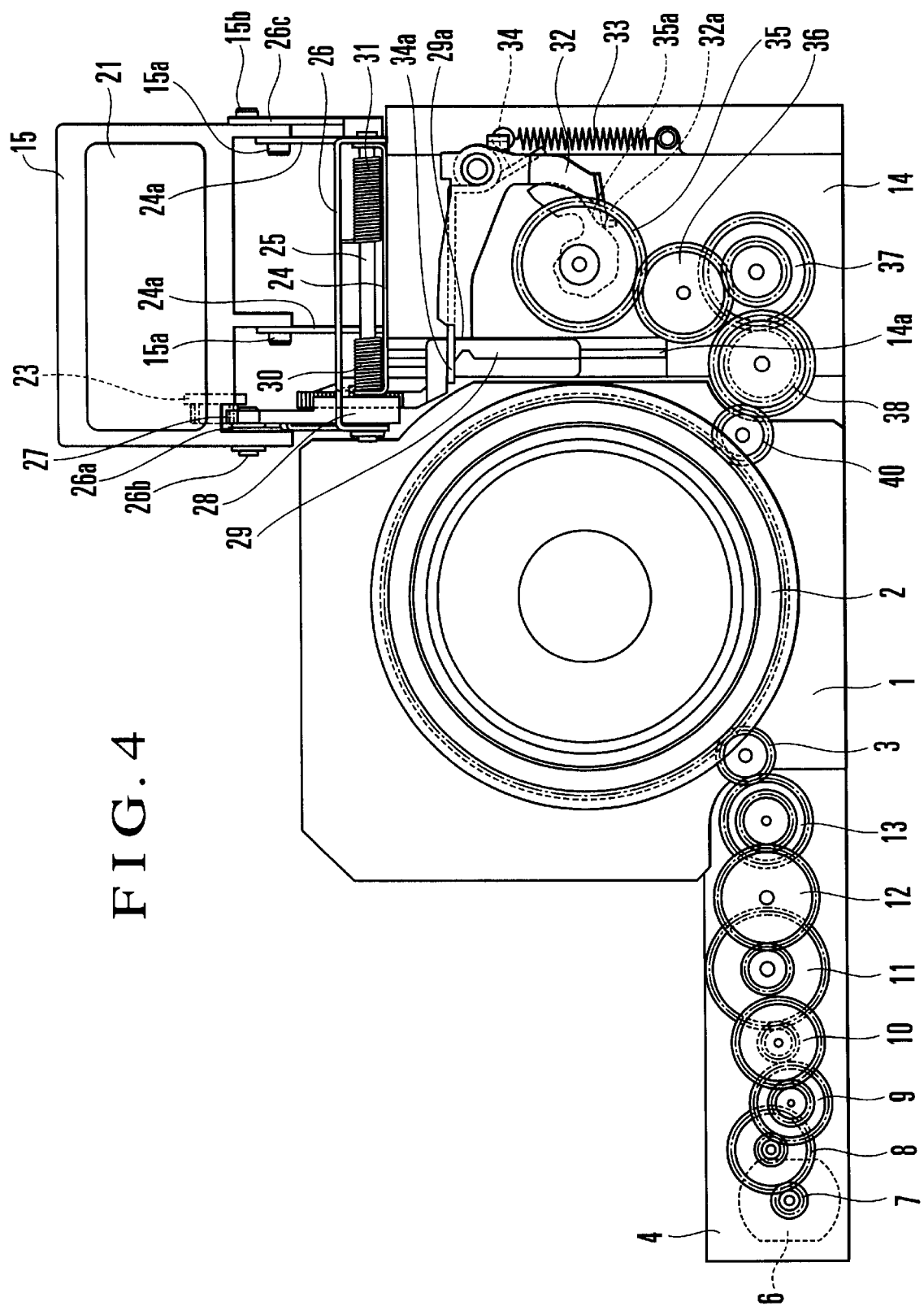
FIG. 4 is a front view showing the arrangement of the camera in a state obtained with the lens barrel at a wide-angle end position.
Figure 5:
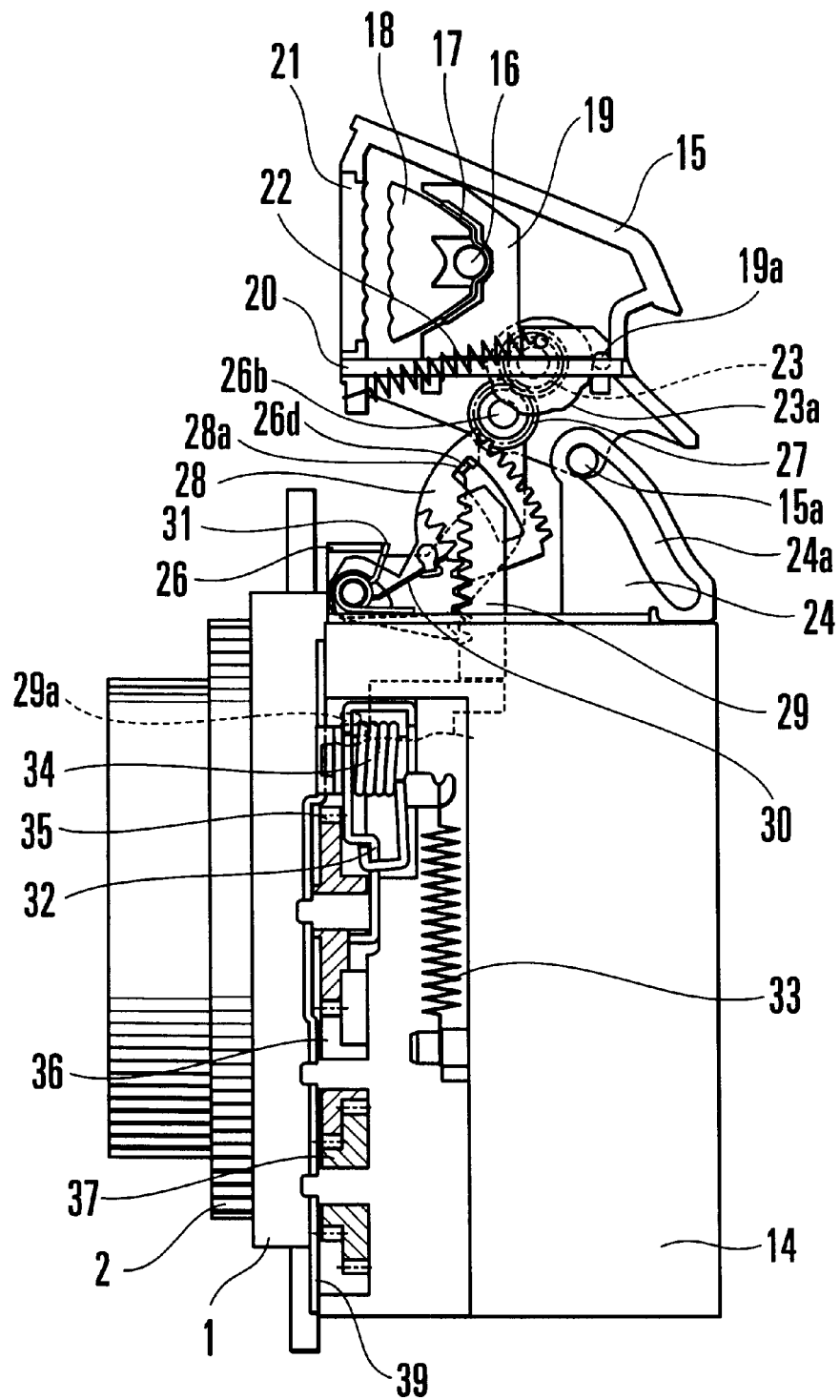
FIG. 5 is a side view showing the arrangement of the camera in a state obtained with the lens barrel at the wide-angle end position.
Figure 6:
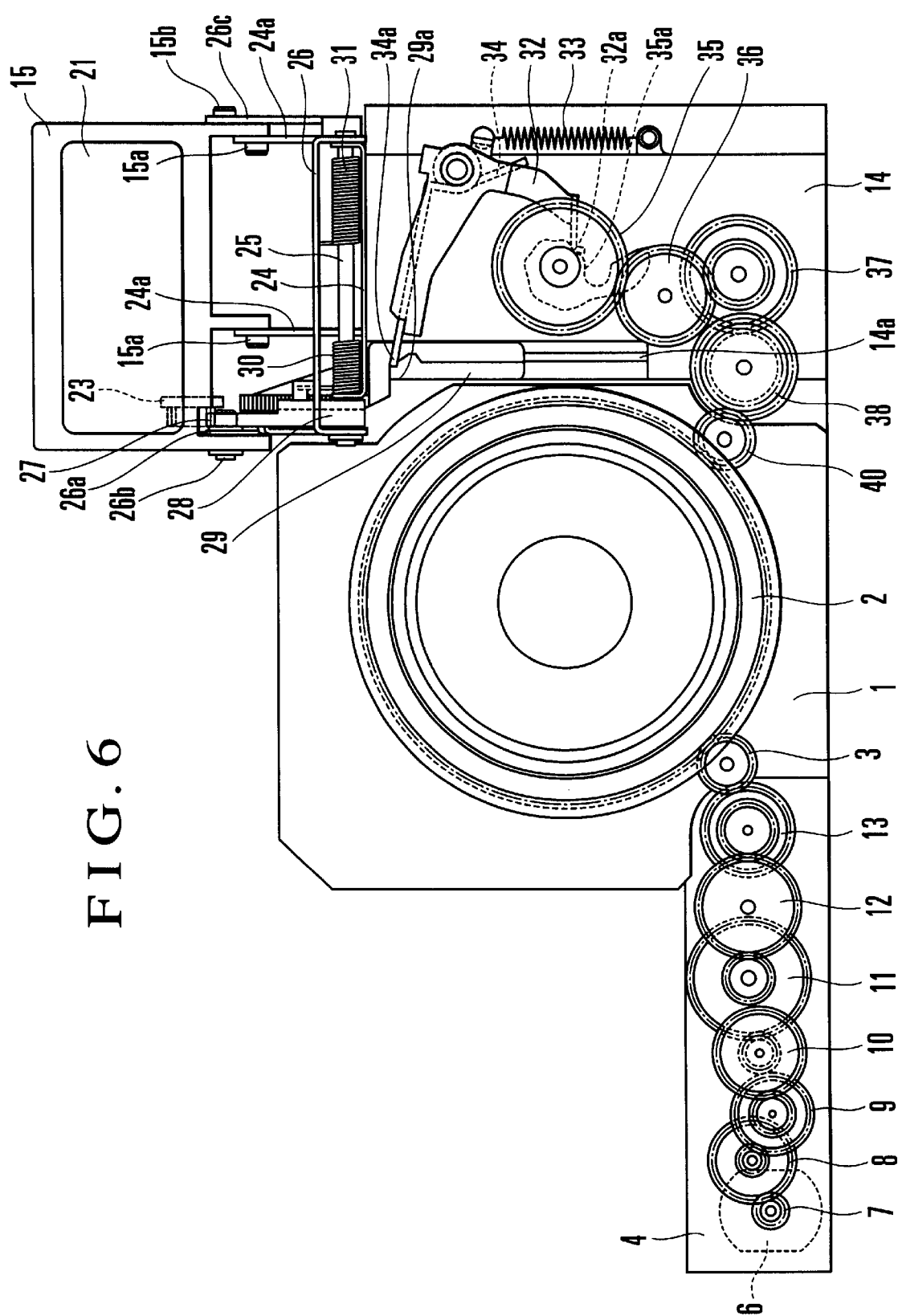
FIG. 6 is a front view showing the arrangement of the camera in a state obtained with the lens barrel at a telephoto end position.
Figure 7:
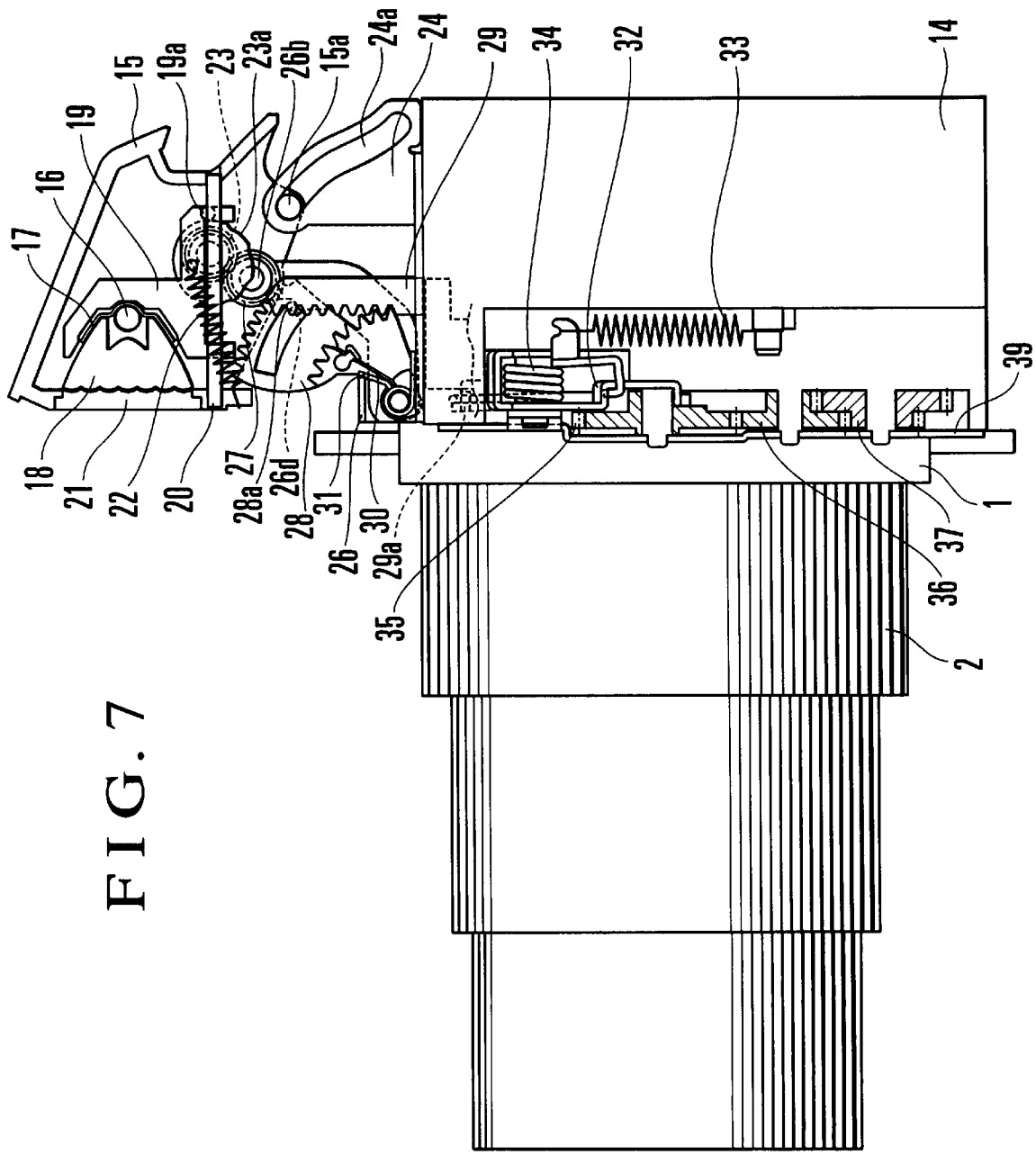
FIG. 7 is a side view showing the arrangement of the camera in the state obtained with the lens barrel at the telephoto end position.

FIGS. 1 to 7 show in outline the arrangement of a camera according to a first embodiment of the invention. Of these figures, FIGS. 1, 2 and 3 show a state in which a lens barrel is drawn in. FIGS. 4 and 5 show a state in which the lens barrel is at a wide-angle end position. FIGS. 6 and 7 show a state in which the lens barrel is at a telephoto end position.

Referring to FIGS. 1 to 7, a fixed tube 1 is arranged as the base of the lens barrel. A cam tube 2 is helicoid-coupled with the fixed tube 1 and is provided with a helicoid gear for intermeshing with a drive gear 3. The cam tube 2 is arranged to be caused by a rotating force of a reduction gear mechanism to move back and forth in the direction of an optical axis while being caused by a helicoid action to rotate inside the fixed tube 1.

Figure 13:
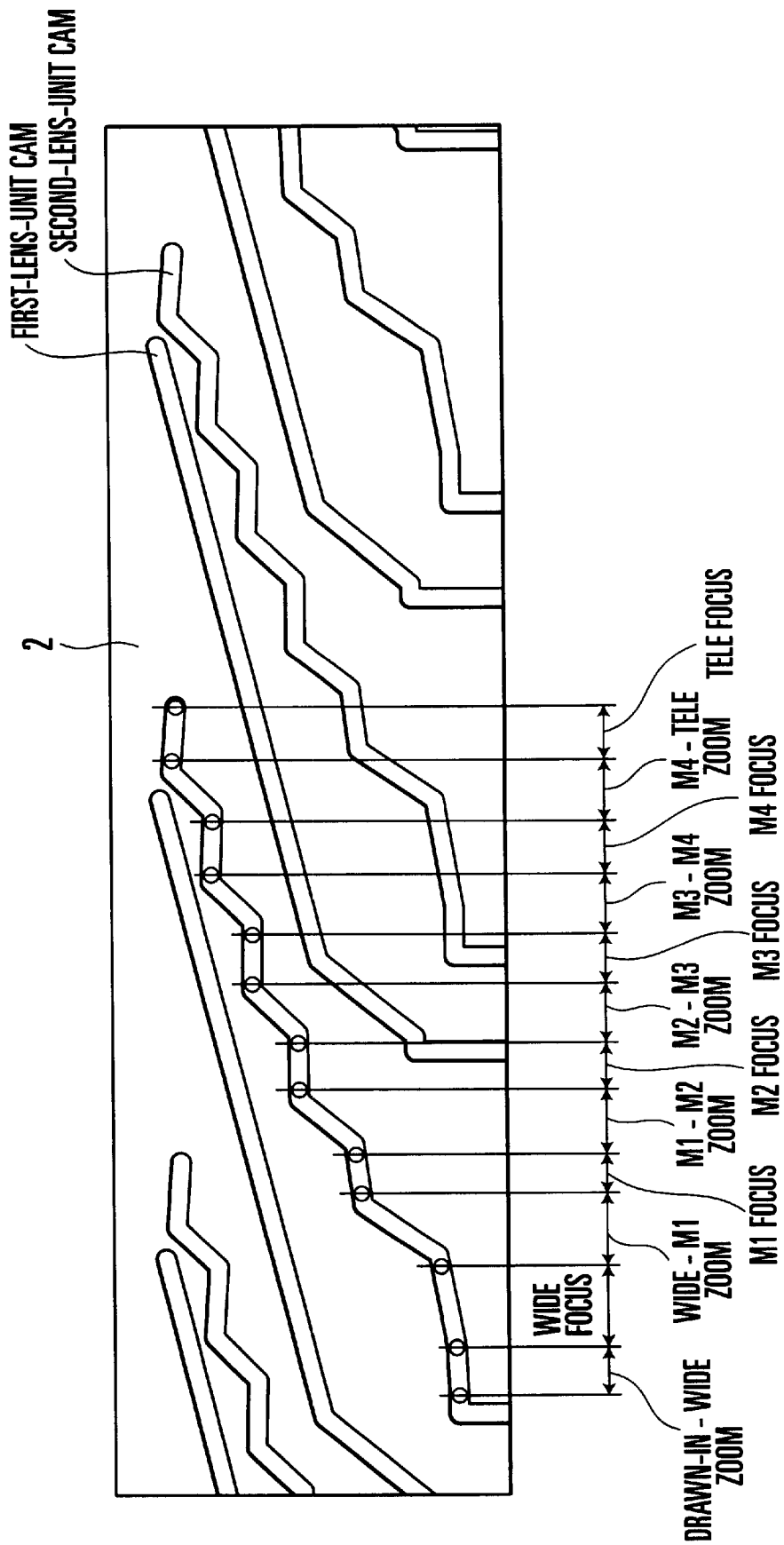
FIG. 13 is a development view showing a cam tube in the camera according to each of the first and second embodiments.

As shown in FIG. 13, the cam tube 2 has six zoom driving cam areas ("DRAWN-IN–WIDE", "WIDE–M1", "M1–M2", "M2–M3", "M3–M4" and "M4–TELE") and six focus driving cam areas ("WIDE focus", "M1 focus", "M2 focus", "M3 focus", "M4 focus" and "TELE focus"). These zoom-driving and focus-driving cam areas are alternately formed in a manner as shown in FIG. 13. With the cam tube 2 rotated and moved in the direction of the optical axis, lenses (not shown) are cam-driven to move in the direction of the optical axis, so that zooming at six steps from the wide-angle end to the telephoto end and focusing at each of the six steps ar e performed.

A reduction gear base plate 4 is arranged to hold a reduction gear mechanism. The gear mechanism is provided with a reduction gear cover 5. A motor 6 is a drive source for the lens barrel. A pinion gear 7 is secured to the output shaft of the motor 6. Toothed wheels 8 to 12 form a reduction gear which is arranged to reduce the rotating speed of the pinion gear 7.

A clutch mechanism 13 is arranged as follows. As shown in FIG. 3, in a normal state, protruding-and-recessed parts 13c provided in a gear 13a and a gear 13b are in mesh with each other under the urging force of a spring 13d, so that the gear 13a and the gear 13b are rotatable integrally with a shaft 13e to allow a rotating force of the motor 6 on the gear 13b to be transmitted from the gear 13a to the drive gear 3. In a case where any load that exceeds the urging force of the spring 13d is imposed by an external force on the lens barrel, the gear 13b slides over the shaft 13e to disconnect the protruding-and-recessed parts 13c from each other, so that the gear 13a is disengaged from the gear 13b. As a result, the load imposed by the external force on the lens barrel is not transmitted to the mechanism between the gear 13b and the motor 6. The mechanism is thus effectively protected.

A camera body 14 is arranged to hold the fixed tube 1 and a flash device mechanism (to be described later). A flash device case 15 is arranged to hold an emission light source part (to be described later) and a Fresnel lens 21 therein. Further, the flash device case 15 is arranged to be movable to a position protruding from the camera body 14 and to a stowed position by means of a pop-up mechanism (to be described later). A flash light emitting part is formed jointly by the emission light source part, the Fresnel lens 21 and the flash device case 15.

The emission light source part is composed of a xenon lamp 16, a reflector 17 and a light guide 18, and is held by a holder 19. The holder 19 is held by a zoom guide shaft 20 in such a way as to be movable in the direction of the optical axis of the flash device. Further, the holder 19 is urged by a holder spring 22. By the urging force of the holder spring 22, an abutting shaft 19a which is provided at the holder 19 is caused to eccentrically abut on the cam surface 23a of a holder cam gear 23 which is held by the flash device case 15.

A flash device base plate 24 is secured to the camera body 14. A cam shaft 15a of the flash device case 15 is fitted into a cam slot 24a which is formed in the flash device base plate 24.

A rotation shaft 25 is held by the flash device base plate 24. An arm 26 is held by the rotation shaft 25. A shaft 26b which is provided at one end 26a of the arm 26 holds an arm gear 27, and is fitted into a hole of the flash device case 15. The other end 26c of the arm 26 is provided with a hole. A support shaft 15b provided on the flash device case 15 is fitted into the hole of the arm 26.

A sector gear 28 is arranged to transmit to the arm gear 27 a driving force of a rack 29 which is arranged to make a rectilinear motion on a rail 14a formed on the camera body 14. The sector gear 28 includes a first gear part which is in mesh with the rack 29 and a second gear part which is in mesh with the arm gear 27. A sector spring 30 eccentrically urges the sector gear 28 to move counterclockwise and also urges the rack 29 to move upward respectively as shown in the sectional views of FIG. 2, etc.

An up spring 31 is arranged to eccentrically urge the arm 26 to move counterclockwise as shown in the sectional views. A lever 32 has an abutting part 32a urged by a lever spring 33 to be eccentrically abutting on a cam surface 35a of an interlocking cam gear 35.

An absorbing spring 34 is held by the lever 32 and is arranged to convert the swinging motion of the lever 32 into a rectilinear motion of the rack 29 by having its fore end 34a abut on the abutting surface 29a of the rack 29.

A drive gear 40 is arranged to be in mesh with a gear part formed along a peripheral part of the cam tube 2. Interlocking gears 36, 37 and 38 are arranged to transmit the rotating force of the drive gear 40 to the interlocking cam gear 35. A keep plate 39 is arranged to push the rack 29, the lever 32, the interlocking cam gear 35 and the interlocking gears 36, 37 and 38 against the camera body 14 to retain them in place.

A mechanism for interlocking luminous intensity distribution angles of the flash device is formed by the drive gear 40, the interlocking gears 36, 37 and 38, the interlocking cam gear 35, the lever 32, the rack 29, the sector spring 30, the absorbing spring 34, the sector gear 28, the arm 26, the up spring 31, the arm gear 27 and the holder cam gear 23. A mechanism for interlocking flash device stowing and protruding actions is formed by the drive gear 40, the interlocking gears 36, 37 and 38, the interlocking cam gear 35, the lever 32, the rack 29, the sector spring 30, the absorbing spring 34, the sector gear 28, the arm 26 and the up spring 31.

Figure 8:
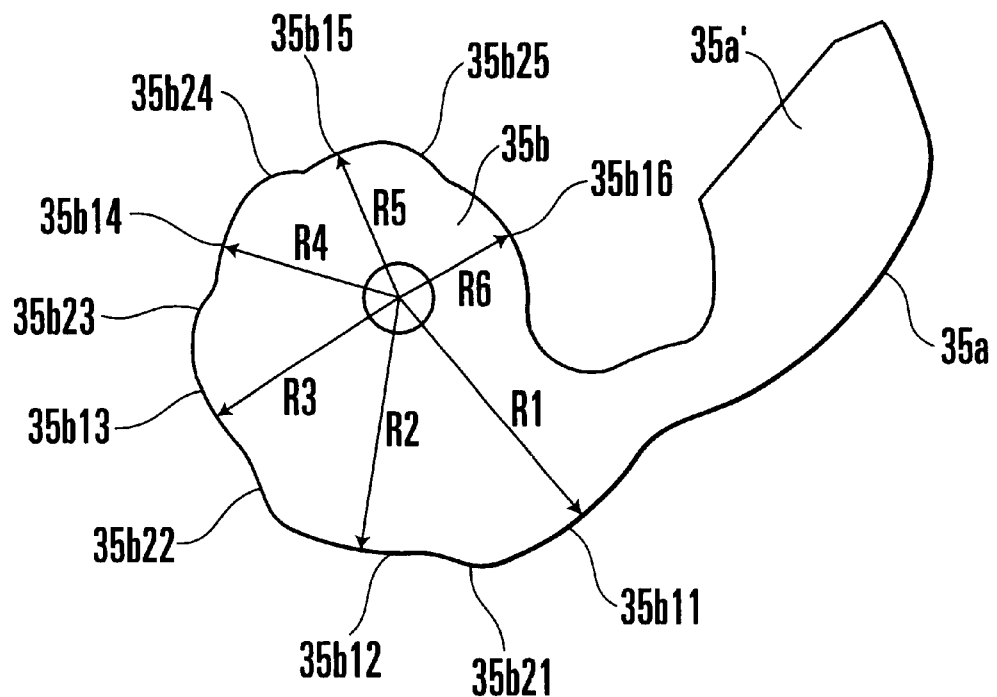
FIG. 8 is a detail view showing a flash device zooming cam part of an interlocked cam gear employed in the camera.

The shape of a cam part which is formed integrally with the interlocking cam gear 35 is next described with reference to FIG. 8. Referring to FIG. 8, this cam part is formed around the shaft of the interlocking cam gear 35, and is composed of a flash device zooming cam part 35b arranged to cam-drive the lever 32 for varying a luminous intensity distribution angle of the flash device according to the zooming state of the lens barrel as will be described later herein, and an extension part 35a' which extends from a part of the flash device zooming cam part 35b and has a cam surface 35a formed for cam-driving the lever 32 to pop up and pop down the flash device in a manner as described later herein.

Along the periphery of the flash device zooming cam part 35b, there are formed cam areas one after another in the order of, from a part adjoining the cam surface 35a, a first luminous intensity distribution angle unvarying cam area 35b11 which has a constant lift R1, a first luminous intensity distribution angle varying area 35b21 where the lift R1 decreases to a lift R2, a second luminous intensity distribution angle unvarying area 35b12 which has the constant lift R2, a second luminous intensity distribution angle varying area 35b22 where the lift R2 decreases to a lift R3, a third luminous intensity distribution angle unvarying area 35b13 which has the constant lift R3, a third luminous intensity distribution angle varying area 35b23 where the lift R3 decreases to a lift R4, a fourth luminous intensity distribution angle unvarying area 35b14 which has the constant lift R4, a fourth luminous intensity distribution angle varying area 35b24 where the lift R4 decreases to a lift R5, a fifth luminous intensity distribution angle unvarying area 35b15 which has the constant lift R5, a fifth luminous intensity distribution angle varying area 35b25 where the lift R5 decreases to a lift R6, and a sixth luminous intensity distribution angle unvarying area 35b16 which has the constant lift R6.

The lever 32 comes to abut on the first luminous intensity distribution angle varying cam area 35b21 when the lens is located within the "WIDE–M1" zoom driving cam area shown in FIG. 13. The lever 32 comes to abut on the second luminous intensity distribution angle varying cam area 35b22 when the lens is located within the "M1–M2" zoom driving cam area shown in FIG. 13. The lever 32 comes to abut on the third luminous intensity distribution angle varying cam area 35b23 when the lens is located within the "M2–M3" zoom driving cam area. The lever 32 comes to abut on the fourth luminous intensity distribution angle varying cam area 35b24 when the lens is located within the "M3–M4" zoom driving cam area. The lever 32 comes to abut on the fifth luminous intensity distribution angle varying cam area 35b25 when the lens is located within the "M4–TELE" zoom driving cam area.

Further, the lever 32 comes to abut on the first luminous intensity distribution angle unvarying cam area 35b11 when the lens is located within the WIDE focus driving cam area shown in FIG. 13. The lever 32 comes to abut on the second luminous intensity distribution angle unvarying cam area 35b12 when the lens is located within the M1 focus driving cam area shown in FIG. 13. The lever 32 comes to abut on the third luminous intensity distribution angle unvarying cam area 35b13 when the lens is located within the M2 focus driving cam area. The lever 32 comes to abut on the fourth luminous intensity distribution angle unvarying cam area 35b14 when the lens is located within the M3 focus driving cam area. The lever 32 comes to abut on the fifth luminous intensity distribution angle unvarying cam area 35b15 when the lens is located within the M4 focus driving cam area. The lever 32 abuts on the sixth luminous intensity distribution angle unvarying area 35b16 when the lens is located within the TELE focus driving cam area.

The camera arranged as described above operates as described below. Actions to be performed in drawing out (protruding) the lens barrel from its drawn-in position to its wide-angle end position are first described.

With the camera in the state as shown in FIGS. 1 and 2, when the main switch (not shown) is turned on, the motor 6 drives, through the gear train composed of gears 7, 8, 9, 10, 11, 12, 13 and 3, the lens barrel to move in the direction of the optical axis while making a rotating motion. The interlocking cam gear 35 is then caused to rotate counterclockwise (as viewed in FIG. 1) through the cam tube 2, the drive gear 40 and the interlocking gears 36, 37 and 38. This causes the lever 32 to swing clockwise (as viewed in FIG. 1) along the cam surface 35a of the interlocking cam gear 35 together with the absorbing spring 34.

The fore end 34a of the absorbing spring 34 which has been pushing the abutting surface 29a of the rack 29 comes to move upward. The urging force of the sector spring 30 causes the rack 29 to move upward accordingly as the fore end 34a of the absorbing spring 34 moves upward. The sector gear 28 which is in mesh with the rack 29 then rotates counterclockwise as viewed in FIG. 2. This causes the arm gear 27 which is in mesh with the sector gear 28 to rotate counterclockwise as viewed in FIG. 2.

As a result, the arm 26 which holds the arm gear 27 is caused by the urging force of the up spring 31 to swing counterclockwise (as viewed in FIG. 2). The flash device case 15 which is fittingly held by the two ends of the arm 26 comes to pop up along the cam slot 24a of the flash device base plate 24. The state of the camera then becomes as shown in FIGS. 4 and 5.

When the camera reaches a state in which the lens barrel is zoomed to the wide-angle end position and the flash device is popped up as shown in FIGS. 4 and 5, a zoom position detecting switch (not shown) detects the wide-angle end position. A braking current is applied to the motor 6 to bring the drawing-out action on the lens barrel to a stop. The lens barrel and the flash device then stop from moving. In the state thus obtained, photo-taking with the camera becomes possible.

Actions to be performed by the camera in zooming the lens barrel from the wide-angle end position toward the telephoto end position are next described as follows. With the camera in the state shown in FIGS. 4 and 5, when a zoom switch (not shown) is operated, the lens barrel begins to act. The interlocking cam gear 35 rotates counterclockwise, as viewed in FIG. 4. Then, the abutting position of the lever 32 on the interlocking cam gear 35 shifts from the cam surface 35a to the flash device zooming cam part 35b. The lever 32 swings clockwise step by step, as viewed in FIG. 4, when the cam abutting position shifts through the first luminous intensity distribution angle unvarying cam area 35b11 (shown in FIG. 8) to each of the luminous intensity distribution angle varying cam areas 35b21 to 35b25. The sector gear 28 then rotates counterclockwise, as viewed in FIG. 5, every time the lever 32 swings clockwise by one step.

When the lens barrel is driven from the drawn-in position to the wide-angle end position, the flash device case 15 is allowed to make the pop-up motion along the cam slot 24a. However, the flash device case 15 reaches the end of the cam slot 24a and is not allowed to pop up any further when the lens barrel reaches the wide-angle end position. Therefore, the rotating force of the sector gear 28 comes to be transmitted to the holder cam gear 23 through the arm gear 27 to cause the holder cam gear 23 to rotate. With the holder cam gear 23 caused to rotate, the holder 19 is drawn out toward the object of shooting along the cam surface 23a of the holder cam gear 23. An interval between the emission light source and the Fresnel lens 21 then becomes shorter stepwise to make a luminous intensity distribution angle and a guide number of the flash device corresponding to each of zoom positions (zooming steps).

When the lens barrel reaches its telephoto end zoom position as shown in FIGS. 6 and 7, the zoom position detecting switch (not shown) detects the arrival at the telephoto end position. A braking current is applied to the motor 6 to stop the lens barrel from moving. The lens barrel and the flash device then come to a stop at their telephoto end positions.

Actions to be performed in zooming the lens barrel from the telephoto end position toward the wide-angle end position are described as follows. With the camera in the state as shown in FIGS. 6 and 7, when the zoom switch (not shown) is operated toward its wide-angle end position, the lens barrel begins to act. The interlocking cam gear 35 then rotates clockwise, as viewed in FIG. 6. The abutting position of the lever 32 on the interlocking cam gear 35 shifts from the fifth luminous intensity distribution angle varying cam area 35b25 toward the first luminous intensity distribution angle varying cam area 35b21. The lever 32 then swings counterclockwise, as viewed in FIG. 6, step by step every time the cam abutting position comes to each of the luminous intensity distribution angle varying cam areas 35b25 to 35b21. The sector gear 28 then rotates clockwise, as viewed in FIG. 7, every time the lever 32 swings counterclockwise by one step.

The rotating force of the sector gear 28 is then transmitted to the holder cam gear 23 through the arm gear 27 to cause the holder cam gear 23 to rotate. With the holder cam gear 23 thus caused to rotate, the holder 19 is drawn inward in the direction opposite to the object of shooting along the cam surface 23a of the holder cam gear 23. An interval between the emission light source and the Fresnel lens 21 then becomes longer stepwise to make a luminous intensity distribution angle and a guide number of the flash device corresponding to each of zoom positions (zooming steps).

When the lens barrel reaches its wide-angle end zoom position as shown in FIGS. 4 and 5, the zoom position detecting switch (not shown) detects the arrival at the wide-angle end position. Then, after the lapse of a predetermined period of time, a braking current is applied to the motor 6 to stop the lens barrel from moving. The lens barrel and the flash device then come to a stop at their wide-angle end positions.

Actions to be performed in shifting the lens barrel position from the wide-angle end position to the drawn-in position are next described. With the camera in the state as shown in FIGS. 4 and 5, when the main switch (not shown) is turned off, the interlocking cam gear 35 rotates clockwise (as viewed in FIG. 4) contrary to driving the lens barrel from the drawn-in position to the wide-angle end position. The lever 32 then swings counterclockwise, as viewed in FIG. 4, along the cam surface 35a of the interlocking cam gear 35 with the absorbing spring 34 following the swinging motion of the lever 32.

Then, with the abutting surface 29a of the rack 29 being pushed down by the fore end 34a of the absorbing spring 34, the rack 29 moves downward against the urging force of the sector spring 30. This causes the sector gear 28 to begin to rotate clockwise as viewed in FIG. 5. When the sector gear 28 rotates clockwise further, the abutting surface 28a of the sector gear 28 comes to abut on a stopper 26d of the arm 26. After that, therefore, the arm 26 swings clockwise in association with the rotation of the sector gear 28.

At the commencement of the clockwise swing of the arm 26, the flash device case 15 begins to pop down along the cam slot 24a.

When the zoom position detecting switch (not shown) detects the arrival of the lens barrel at the drawn-in position, the lens barrel is stopped from moving by applying a braking current to the motor 6 after the lapse of a predetermined period of time. The camera comes to take the state of having the lens barrel at the drawn-in position and the flash device at its popped-down position as shown in FIGS. 1 and 2. Then, with the lens barrel and the flash device thus stowed in the camera, photo-taking with the camera becomes impossible.

Figure 9:
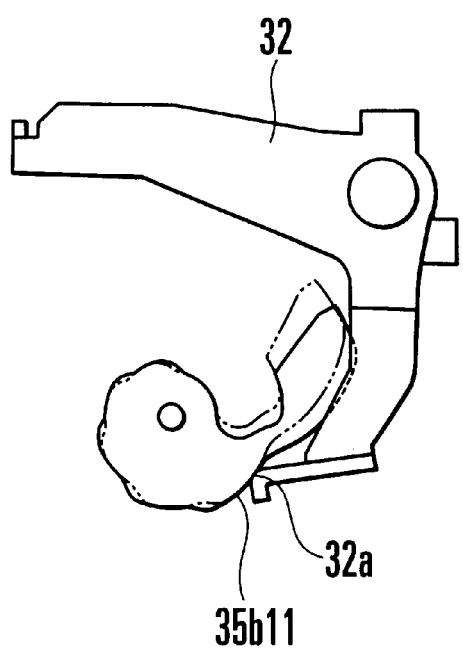
FIG. 9 is a diagram for explaining the motion of the flash device zooming cam part during focusing when the lens barrel of the camera is at the wide-angle end position.

Next, actions to be performed in focusing at each of the zoom positions are described as follows. When the camera is in the wide-angle end zooming state as shown in FIGS. 4 and 5, for example, the flash device zooming cam part 35b of the interlocking cam gear 35 and the lever 32 are located at positions indicated with full lines in FIG. 9. In other words, the lever 32 is at a position where the lever 32 abuts on a part in the neighborhood of one end of the first luminous intensity distribution angle unvarying cam area 35b11 in the counterclockwise direction (on the infinity distance side).

When a focusing action is performed for the nearest distance under this condition, the lens barrel begins to act. Then, as in driving from the wide-angle end position toward the telephoto end position, the interlocking cam gear 35 is caused through the cam tube 2, the drive gear 40 and the interlocking gears 36, 37 and 38 to rotate counterclockwise. When focusing is made up to the nearest distance focus position, the interlocking cam gear 35 (the flash device zooming cam part 35b) rotates to a position indicated with a broken line in FIG. 9. At this time, however, the lever 32 is still abutting on a part in the neighborhood of the end of the first luminous intensity distribution angle unvarying cam area 35b11.

Figure 10:
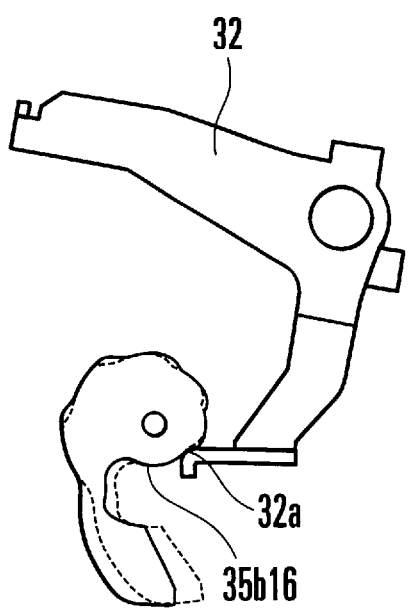
FIG. 10 is a diagram for explaining the motion of the flash device zooming cam part during focusing when the lens barrel of the camera is at the telephoto end position.

Further, when the camera is in the telephoto end zoom state as shown in FIGS. 6 and 7, the flash device zooming cam part 35b of the interlocking cam gear 35 and the lever 32 are at their positions indicated with full lines in FIG. 10. In other words, the lever 32 is at a position where the lever 32 abuts on a part in the neighborhood of one end of the sixth luminous intensity distribution angle unvarying cam area 35b16 in the counterclockwise direction (on the infinity distance side).

When a focusing action is performed for the nearest distance under this condition, the lens barrel begins to act. Then, as in driving from the wide-angle end position toward the telephoto end position, the interlocking cam gear 35 is caused through the cam tube 2, the drive gear 40 and the interlocking gears 36, 37 and 38 to rotate counterclockwise. When focusing is made up to the nearest distance focus position, the interlocking cam gear 35 (the flash device zooming cam part 35b) rotates to a position indicated with a broken line in FIG. 10. At that time, however, the lever 32 is still abutting on a part in the neighborhood of the end of the sixth luminous intensity distribution angle unvarying cam area 35b16 in the clockwise direction. A focusing action at any of other intermediate zoom positions is performed likewise.

In other words, even when focusing is performed at each of zoom positions, the lever 32 does not swing because the abutting position of the lever 32 on the flash device zooming cam part 35b varies only within each of the luminous intensity distribution angle unvarying cam areas where the cam lift remains unchanged. Since the lever 32 does not swing, the holder 19 remains stationary without being drawn out toward the object of shooting nor drawn inward in the direction opposite thereto. The luminous intensity distribution angle and the guide number of the flash device are, therefore, never caused to vary by the focusing action.

Figure 11:
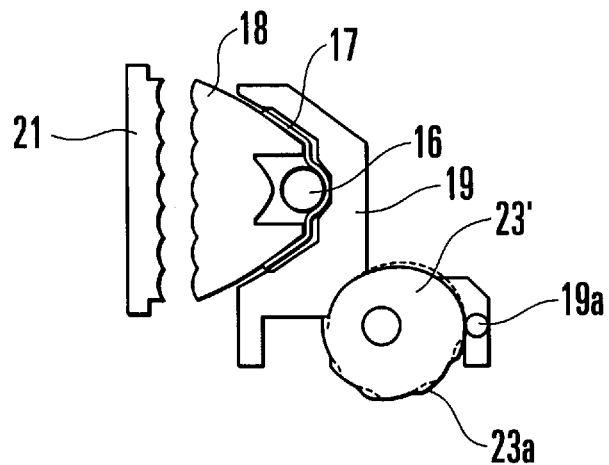
FIG. 11 is a diagram for explaining the motion of a flash device zooming cam part in a flash light emitting part of a camera, according to a second embodiment of the invention, during focusing when a lens barrel of the camera is at the wide-angle end position.
Figure 12:
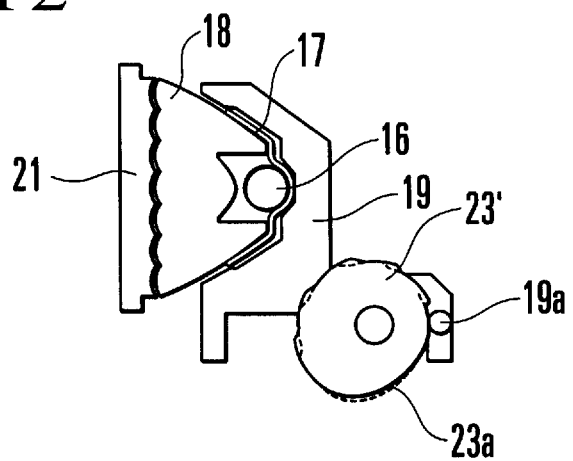
FIG. 12 is a diagram for explaining the motion of the flash device zooming cam part in the flash light emitting part according to the second embodiment during focusing when the lens barrel is at the telephoto end position.

FIGS. 11 and 12 show the internal arrangement of a flash light emission part of a camera according to a second embodiment of the invention. The basic arrangement of the camera according to the second embodiment is identical with that of the first embodiment. All component elements of the second embodiment that are the same as those of the first embodiment are denoted by the same reference numerals, and the details of them are omitted from the description.

The second embodiment differs from the first embodiment in the following point. While the cam, i.e., the flash device zooming cam part 35b, is formed integrally with the interlocking cam gear 35 which is disposed inside of the camera body in the first embodiment, this cam is disposed within the flash light emission part in the case of the second embodiment.

In other words, in the case of the second embodiment, a holder cam gear 23' is formed in the same manner as the flash device zooming cam part 35b in the first embodiment.

In the second embodiment, in zooming the lens barrel from the wide-angle end position to the telephoto end position, the holder cam gear 23' rotates counterclockwise as viewed in FIG. 11. The holder 19 is then drawn out stepwise toward the object of shooting every time the abutting position of the abutting shaft 19a of the holder 19 on the holder cam gear 23' shifts to each of luminous intensity distribution angle varying cam areas. This causes an interval between the emission light source part and the Fresnel lens 21 to become shorter in a stepwise manner. As a result, a luminous intensity distribution angle and a guide number of the flash device can be varied correspondingly with each of different zoom positions (zooming steps).

In zooming the lens barrel from the telephoto end position to the wide-angle end position, the holder cam gear 23' rotates clockwise as viewed in FIG. 12. With the holder cam gear 23' thus caused to rotate, the holder 19 is drawn inward in the direction opposite to the object of shooting stepwise every time the abutting position of the abutting shaft 19a of the holder 19 on the holder cam gear 23' shifts to each of luminous intensity distribution angle varying cam areas. An interval between the emission light source and the Fresnel lens 21 then becomes longer stepwise to make a luminous intensity distribution angle and a guide number corresponding to each of zoom positions (zooming steps).

When a focusing action is performed in a wide-angle end zoom and focusing infinity distance state as shown by a full line in FIG. 11 for the nearest distance, the lens barrel begins to act to cause the holder cam gear 23' to rotate counterclockwise. When the focusing position reaches a nearest distance point, the holder cam gear 23' rotates up to a position indicated by a broken line in FIG. 11. While the focusing action is in process, the abutting position of the abutting shaft 19a of the holder 19 on the holder cam gear 23' shifts only within the first luminous intensity distribution angle unvarying cam area of the holder cam gear 23'.

Further, when the focusing action is performed in a telephoto end zoom and focusing infinity distance state as shown in FIG. 12, the lens barrel acts to cause the holder cam gear 23' to rotate counterclockwise. When the focusing position reaches a nearest distance point, the holder cam gear 23' rotates up to a position indicated by a broken line in FIG. 12. However, while the focusing is in process, the abutting position of the abutting shaft 19a of the holder 19 on the holder cam gear 23' shifts only within the sixth luminous intensity distribution angle unvarying cam area of the holder cam gear 23'.

In other words, even when a focusing action is performed at each of zoom positions, the holder 19 remains stationary and is not drawn out toward the object of shooting nor drawn inward in the direction opposite to the object, because the abutting position of the abutting shaft 19a of the holder 19 on the holder cam gear 23' varies only within each luminous intensity distribution angle unvarying cam area where the cam lift is unchanged. Therefore, the luminous intensity distribution angle and the guide number of the flash device are never caused to vary by the focusing action.

The luminous intensity distribution angle of the flash device is adjusted by the relative positions of the holder 19 and the Fresnel lens 21. Therefore, the arrangement for incorporating a flash device zooming cam part in the holder cam gear 23' arranged to drive the holder 19 effectively minimizes the possibility of having the luminous intensity distribution angle inadequately adjusted due to some manufacturing error of parts interlocking the lens barrel and the flash light emitting part.

Each of the embodiments described is arranged to use a cam for preventing a zooming action on the stepped zoom lens barrel and a luminous-intensity-distribution-angle adjustment driving action on the flash device from being performed in an interlocked manner at the time of focusing. In accordance with the invention, however, the arrangement for using the cam may be replaced with any other suitable mechanism so long as such a mechanism gives the same result as the result attainable by the cam.

According to the arrangement of each of the embodiments described above, the so-called stepped zoom type camera is provided with a luminous intensity distribution angle interlocking mechanism. This mechanism is arranged to vary the luminous intensity distribution angle of a flash light emitting part in association with a zooming action of a photo-taking lens in zooming and to keep the luminous intensity distribution angle of the flash light emitting part unvarying in focusing the photo-taking lens. With the mechanism arranged in this manner, while the luminous intensity distribution angle of the flash device always can be adjusted to an angle apposite to the zoomed state of the photo-taking lens, the luminous intensity distribution angle remains unchanged even when the focusing state of the photo-taking lens changes. Therefore, photo-taking by flash photography can be carried out without being affected by focusing.

In the luminous intensity distribution angle interlocking mechanism, a luminous intensity distribution angle driving cam member is formed to have the luminous intensity distribution angle varying areas where the amount of cam lift varies arranged alternately with the luminous intensity distribution angle unvarying cam areas where the amount of cam lift remains constant. The mechanism thus can be simply arranged to attain the above-stated advantageous effect.

Further, with the luminous intensity distribution angle driving cam member formed integrally with a gear member which forms the luminous intensity distribution angle interlocking mechanism, the number of necessary parts can be lessened for reduction in cost and size.

With the flash light emitting part arranged to be stowable and protrusible in and from the camera body, the arrangement for having the luminous intensity distribution angle driving cam member disposed within the camera body enables the luminous intensity distribution angle driving cam member to be supported by the camera body to obviate the necessity of having the luminous intensity distribution angle driving cam member supported by any member that is provided solely for that purpose. The arrangement permits a reduction in cost and size of the camera.

Further, with the flash light emitting part arranged to be stowable and protrusible in and from the camera body, the arrangement for having the luminous intensity distribution angle driving cam member disposed within the flash light emitting part, particularly near to the flash device zooming mechanism, effectively lessens the possibility of deviation of adjustment of the distribution angle from the zoomed state of the photo-taking lens due to manufacturing errors of parts.

Further, with the luminous intensity distribution angle interlocking mechanism arranged to vary the luminous intensity distribution angle of the flash light emitting part by converting the rotary motion of a lens driving mechanism into a vertical linear motion and to further convert the rectilinear motion into a linear motion in the direction of the optical axis of the flash light emitting part, the mechanism which interlocks the lens driving mechanism with the flash light emitting part can be efficiently disposed within the camera.

Further, with at least a part of the luminous intensity distribution angle varying mechanism arranged to interlock the stowing and protruding actions on the photo-taking lens with the stowing and protruding actions on the flash light emitting part, the camera can be compactly arranged with a less number of parts to include both the flash-light-emitting-part stowing and protruding function and the luminous intensity distribution angle varying mechanism.

What is claimed is:

1. A camera comprising:
   a lens barrel having a cam part in which a plurality of magnification varying cam areas for varying magnification and a plurality of focusing cam areas for focusing are alternately formed in a continuous manner;
   a flash light emitting part arranged to be capable of varying a luminous intensity distribution angle;
   driving means for causing said lens barrel to rotate around the optical axis, said lens barrel having a lens unit thereof driven along said cam part to perform a magnification varying action or focusing action; and
   rotary cam member for rotating in association with the rotation of said lens barrel, said rotary cam member having a first cam part for varying the luminous intensity distribution angle of said flash light emitting part in a state that said lens unit is driven along the magnification varying cam area and a second cam part for not varying the luminous intensity distribution angle of said flash light emitting part in a state that said lens unit is driven along the focus cam area to be formed therein.

2. A camera according to claim 1, wherein said flash light emitting part includes a light source and a Fresnel lens, and said control means causes a relative interval between the light source and the Fresnel lens to vary.

3. A camera according to claim 1, wherein said rotary cam is arranged to rotate in association with the rotation of said lens barrel.

4. A camera according to claim 3, further comprising a lever arranged to be driven to move by the cam part of said rotary cam, and the luminous intensity distribution angle of said flash light emitting part varies in association with the driven movement of said lever.

5. A camera according to claim 1, wherein said flash light emitting part is in a state of being stowed within a body of said camera when said lens barrel is in a state of not being used.

6. A camera according to claim 5, wherein said flash light emitting part is in a state of being popped up from the body of said camera when said lens barrel is in a state of being used.

7. A camera comprising:

a lens barrel having a cam part in which a plurality of magnification varying cam areas for varying magnification and a plurality of focusing cam areas for focusing are alternately formed in a continuous manner;

a flash light emitting part arranged to be capable of varying a luminous intensity distribution angle;

driving means for causing said lens barrel to move along an optical axis while rotating around the optical axis, said lens barrel having a lens thereof driven along said cam part to perform a magnification varying action or a focusing action; and a rotary cam member arranged to rotate in association with the rotation of said lens barrel, said rotary cam member having, formed therein, a cam part where an amount of cam lift varies correspondingly with one of the plurality of magnification varying cam areas and a cam part where the amount of cam lift remains constant correspondingly with one of the plurality of focusing cam areas, wherein said flash light emitting part is arranged to vary the luminous intensity distribution angle thereof according to the amount of cam lift of said rotary cam member.

8. A camera according to claim 7, wherein said flash light emitting part includes a light source and a Fresnel lens, and a relative interval between the light source and the Fresnel lens varies in accordance with the amount of cam lift.

9. A camera according to claim 7, further comprising a lever arranged to be driven to move by the cam part of said rotary cam member, and the luminous intensity distribution angle of said flash light emitting part varies in association with the driven movement of said lever.

10. A camera comprising:

a lens barrel having a cam part in which a plurality of magnification varying cam areas for varying magnification and a plurality of focusing cam areas for focusing are alternately formed in a continuous manner;

a flash light emitting part arranged to be capable of varying a luminous intensity distribution angle;

driving means for causing said lens barrel to rotate around the optical axis, said lens barrel having a lens unit thereof driven along said cam part to perform a magnification varying action or focusing action; and flash light driving mechanism for varying the luminous intensity distribution angle of said flash light emitting part in a state that said lens unit is driven along the magnification varying cam areas, and on the other hand, for not varying the luminous intensity distribution angle of said flash light emitting part in a state that said lens unit is driven along the focus cam areas.

11. A camera according to claim 10, wherein said flash emitting part includes a light source and a Fresnel lens, and said flash light driving mechanism causes a relative interval between the light source and the Fresnel lens to vary.

12. A camera according to claim 10, wherein said flash light driving mechanism has a rotary cam in which a cam part where an amount of lift varies in one of the plurality of magnification varying areas and a cam part where the amount of lift remains constant in one of the plurality of focusing cam areas are formed, and said flash light emitting part is arranged to vary the luminous intensity distribution angle thereof according to the amount of lift of said rotary cam.

13. A camera according to claim 12, wherein said rotary cam is arranged to rotate in association with the rotation of the lens barrel.

14. A camera according to claim 13, further comprising a lever arranged to be driven to move by the cam part of said rotary cam, and the luminous intensity distribution angle of said flash light emitting part varies in association with the driven movement of said lever.

15. A camera according to claim 10, wherein said flash light emitting part is in a state of being stowed within a body of said camera when said lens barrel is in a state of not being used.

16. A camera according to claim 15, wherein said flash light emitting part is in a state of being popped up from the body of said camera when said lens barrel is in a state of being used.

* * * * *

UNITED STATES PATENT AND TRADEMARK OFFICE
CERTIFICATE OF CORRECTION

PATENT NO. : 6,519,418 B2  Page 1 of 1
DATED : February 11, 2003
INVENTOR(S) : Kazuo Nakagawa It is certified that error appears in the above-identified patent and that said Letters Patent is hereby corrected as shown below:

Column 4,
Line 48, delete "ar e" and insert -- are --.

Signed and Sealed this

Twenty-third Day of September, 2003

JAMES E. ROGAN
*Director of the United States Patent and Trademark Office*